United States Patent
Imai

(10) Patent No.: US 10,291,703 B2
(45) Date of Patent: May 14, 2019

(54) INFORMATION PROCESSING SYSTEM, METHOD OF PROCESSING INFORMATION, AND INFORMATION PROCESSING DEVICE

(71) Applicant: FUJITSU LIMITED, Kawasaki-shi, Kanagawa (JP)

(72) Inventor: Takashi Imai, Atsugi (JP)

(73) Assignee: FUJITSU LIMITED, Kawasaki (JP)

( * ) Notice: Subject to any disclaimer, the term of this patent is extended or adjusted under 35 U.S.C. 154(b) by 3 days.

(21) Appl. No.: 15/585,804

(22) Filed: May 3, 2017

(65) Prior Publication Data
US 2017/0331889 A1 Nov. 16, 2017

(30) Foreign Application Priority Data
May 13, 2016 (JP) ................................. 2016-097349

(51) Int. Cl.
*H04L 29/08* (2006.01)
(52) U.S. Cl.
CPC .............................. *H04L 67/1095* (2013.01)
(58) Field of Classification Search
CPC ................................................. H04L 67/1095
See application file for complete search history.

(56) References Cited

U.S. PATENT DOCUMENTS

| | | | |
|---|---|---|---|
| 2011/0181239 A1* | 7/2011 | Kadoyanna | H02J 7/025 320/108 |
| 2015/0058293 A1 | 2/2015 | Kobayashi et al. | |
| 2015/0255996 A1* | 9/2015 | Kadoyama | H02J 7/025 307/104 |
| 2015/0358408 A1* | 12/2015 | Fukatani | G06F 17/30174 709/204 |

FOREIGN PATENT DOCUMENTS

| | | |
|---|---|---|
| JP | 2015-184876 | 10/2015 |
| WO | 2013/141308 | 9/2013 |

* cited by examiner

*Primary Examiner* — Abdullahi E Salad
(74) *Attorney, Agent, or Firm* — Fujitsu Patent Center

(57) ABSTRACT

An information processing system includes a first information processing device including a first memory and a first processor, and a second information processing device including a second memory and a second processor, wherein the first processor is configured to acquire a first frequency at which first data stored in the first memory has been updated, acquire a second frequency at which the first data stored in the first memory has been updated due to an update of second data stored in the second memory, determine whether a notification indicating that the first data stored in the first memory has been updated is to be transmitted to the second information processing device, based on the first frequency information, the second frequency information, and a state of a communication between the first information processing device and the second information processing device, and transmit the notification.

20 Claims, 18 Drawing Sheets

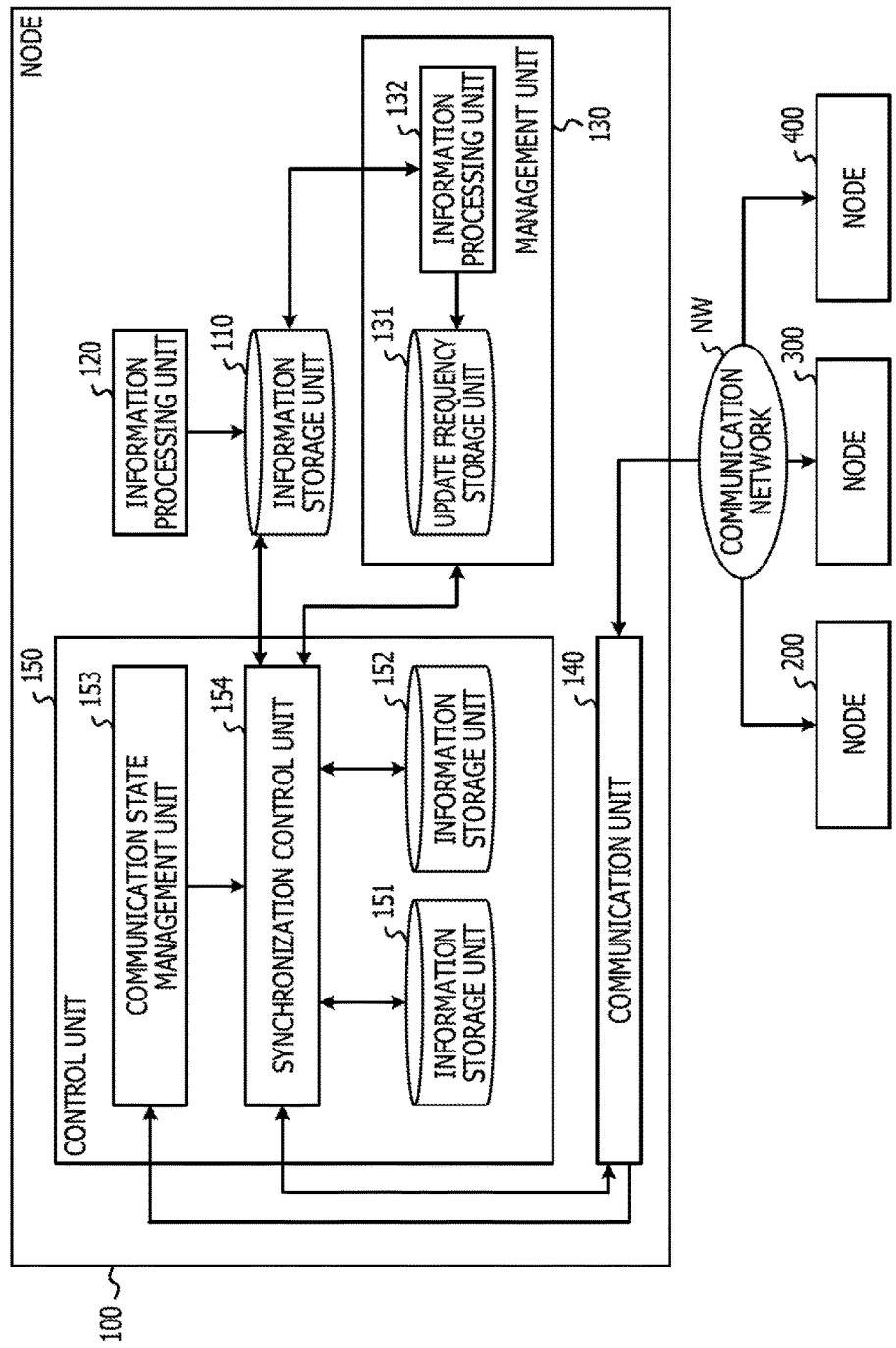

FIG. 4

| KEY | VALUE | LOGICAL TIME | DESCRIPTION |
|---|---|---|---|
| aaa.bbb.0 | 23.4 | 54737 | TRANSMIT SENSING INFORMATION OF SELF NODE ONCE EVERY THREE SECONDS |
| aaa.bbb.A | 26.7 | 54651 | SOME OTHER NODE TRANSMITS SENSING INFORMATION ONCE EVERY FIVE SECONDS |
| aaa.bbb.B | 22.5 | 54384 | SOME OTHER NODE TRANSMITS SENSING INFORMATION ONCE EVERY THREE SECONDS |
| aaa.bbb.X | 24.2 | 54765 | EACH NODE UPDATES AVERAGE VALUE OF SENSING INFORMATION OF ALL NODES AT EACH TIME |
| xxx.0 | FIRST IMAGE INFORMATION | 54654 | TRANSMIT IMAGE ACQUIRED BY SELF NODE EVERY SECOND |
| xxx.A | SECOND IMAGE INFORMATION | 54650 | TRANSMIT IMAGE ACQUIRED BY SELF NODE EVERY SECOND |
| xxx.B | THIRD IMAGE INFORMATION | 54585 | TRANSMIT IMAGE ACQUIRED BY SELF NODE EVERY SECOND |
| xxx.X | FOURTH IMAGE INFORMATION | 38787 | WHEN EACH NODE FINDS SUSPICIOUS IMAGE, TRANSMIT SUSPICIOUS IMAGE |

T1   110

| KEY | TYPE | SELF NODE UPDATE FREQUENCY (TIMES/SECOND) | OTHER-NODE UPDATE FREQUENCY (TIMES/SECOND) | PERMISSIBLE DELAY TIME (SECOND) |
|---|---|---|---|---|
| aaa.bbb.0 | String | 0.3 | 0 | 0.5 |
| aaa.bbb.A | String | 0 | 0.2 | 0.5 |
| aaa.bbb.B | String | 0 | 0.3 | 0.5 |
| aaa.bbb.X | String | 0.3 | 0.5 | 1 |
| xxx.0 | Byte[] | 1.0 | 0 | 5 |
| xxx.A | Byte[] | 0 | 1.0 | 5 |
| xxx.B | Byte[] | 0 | 1.0 | 5 |
| xxx.X | Byte[] | 0.001 | 0.004 | 1 |

T2   131 t1 (= T): FINAL UPDATE TIME (=CURRENT TIME)
t2: IMMEDIATELY PRECEDING UPDATE OCCURRENCE TIME
t3: NEXT TRANSMISSION DETERMINATION TIME
min (1/a, 1/b, t3): NEXT EXPECTED UPDATE TIME
d: COMMUNICATION STATE (bit/second)
e: INFORMATION AMOUNT (bit)

t1 (= T): FINAL UPDATE TIME (=CURRENT TIME)
t2: IMMEDIATELY PRECEDING UPDATE OCCURRENCE TIME
t3: NEXT TRANSMISSION DETERMINATION TIME
t4: PERMISSIBLE DELAY TIME (SECOND)
min (1/a, 1/b, t3): NEXT EXPECTED UPDATE TIME
d: COMMUNICATION STATE (bit/second)
e: INFORMATION AMOUNT (bit)

t1 (= T): FINAL UPDATE TIME (=CURRENT TIME)
t2: IMMEDIATELY PRECEDING UPDATE OCCURRENCE TIME
t3: NEXT TRANSMISSION DETERMINATION TIME
t4: PERMISSIBLE DELAY TIME (SECOND)
min (1/a, 1/b, t3): NEXT EXPECTED UPDATE TIME d: COMMUNICATION STATE (bit/second)
e: INFORMATION AMOUNT (bit)

INFORMATION PROCESSING SYSTEM, METHOD OF PROCESSING INFORMATION, AND INFORMATION PROCESSING DEVICE

CROSS-REFERENCE TO RELATED APPLICATION

This application is based upon and claims the benefit of priority of the prior Japanese Patent Application No. 2016-097349, filed on May 13, 2016, the entire contents of which are incorporated herein by reference.

FIELD

The embodiment discussed herein is related to an information processing system, a method of processing information, and an information processing device.

BACKGROUND

A technology in which a plurality of terminal devices (which will be hereinafter referred to as information processing units) wirelessly communicate with one another mutually via an access point and operate in cooperation has been known. In this technology, as an example of operation performed in cooperation, two tablet terminals share contents and thus display the contents. As a related art document, there is Japanese Laid-open Patent Publication No. 2015-184876.

SUMMARY

According to an aspect of the invention, an information processing system includes a first information processing device including a first memory and a first processor coupled to the first memory, and a second information processing device including a second memory and a second processor coupled to the second memory, the second information processing device being configured to communicate with the first information processing device, wherein the first processor is configured to acquire first frequency information indicating a first frequency at which first data stored in the first memory has been updated, acquire second frequency information indicating a second frequency at which the first data stored in the first memory has been updated due to an update of second data stored in the second memory, determine, when the first data stored in the first memory has been updated, whether a notification indicating that the first data stored in the first memory has been updated is to be transmitted to the second information processing device, based on the first frequency information, the second frequency information, and a state of a communication between the first information processing device and the second information processing device, and transmit, when it is determined that the notification is to be transmitted to the second information processing device, the notification to the second information processing device, and the second processor is configured to update the second data stored in the second memory, based on the notification.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 3 is an exemplary block diagram of a node;

FIG. 4 is a diagram illustrating an example of an information storage unit;

DESCRIPTION OF EMBODIMENT

In a wireless communication environment, an information processing unit is callable of freely moving, and therefore, a communication state between information processing units changes momentarily and a stable communication state is hardly maintained. Also, there is a probability that, when the number of information processing units that belong to the wireless communication environment increases and real-time information sharing is active, a communication fails because the communication exceeds a communication band.

An embodiment of the present disclosure will be described with reference to the accompanying drawings.

Figure 1:
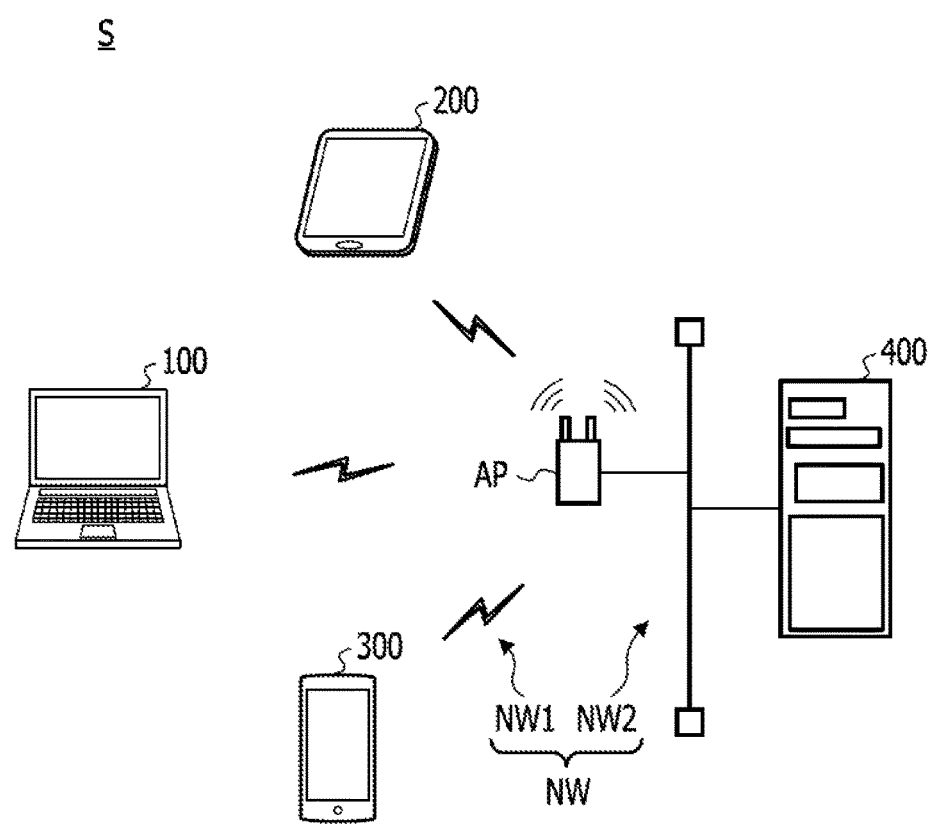
FIG. 1 is a diagram illustrating an example of an information processing system.

FIG. 1 is a diagram illustrating an example of an information processing system S. The information processing system S is a computer system that realizes eventual consistency. The information processing system S includes a plurality of nodes 100, 200, 300, and 400 each of which serves as an information processing unit. The nodes 100, 200, 300, and 400 are coupled to one another via a communication network NW including a wireless base station (for example, an access point) AP. As illustrated in FIG. 1, the communication network NW includes a wired network NW1 and a wireless network NW2. Therefore, the nodes 100, 200, 300, and 400 communicate with one another using wireless or wired networks. Note that an ad-hoc network without going through the wireless base station AP may be used between the nodes 100, 200, and 300.

In this case, as each of the node 100, 200, 300, and 400, for example, a terminal device, a smart device, or the like may be used. As a terminal device, for example, a mobile type personal computer (PC), a desktop type PC, or the like may be used. As a smart device, for example, a smartphone, a smartwatch, a tablet terminal, a wearable computer, or the like may be used. Note that each of the node 100, 200, 300, and 400 is not limited to a terminal device or a smart device, as long as a device includes a communication function, for example, in addition to a household electric appliance, such as a smart television, a microwave oven, or a healthcare supply, a digital camera, a portable video game, or the like may be used. The nodes 100, 200, 300, and 400 transmit information including the same identification information to one another, and thereby, share the information. Such information will be hereinafter referred to as shared information.

Next, with reference to FIG. 2, a hardware configuration of the node 100 will be described. Note that, basically, each of the above-described nodes 200, 300, and 400 has a similar hardware configuration to that of the node 100, and therefore, the description thereof will be omitted.

Figure 2:
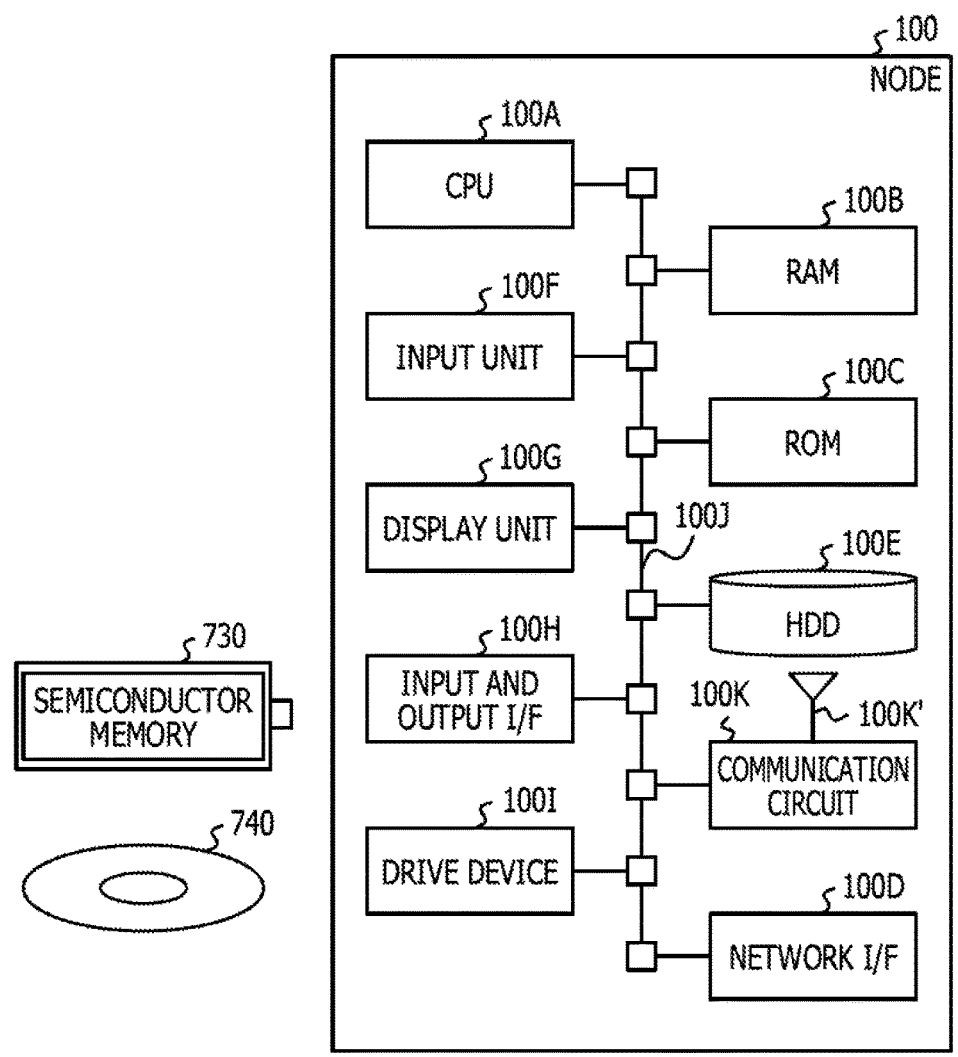
FIG. 2 is a diagram illustrating an example of a hardware configuration of a node.

FIG. 2 is a diagram illustrating an example of a hardware configuration of the node 100. As illustrated in FIG. 2, the node 100 includes at least a central processing unit (CPU) 100A, random access memory (RAM) 100B, read only memory (ROM) 100C, a network interface (I/F) 100D, and a communication circuit 100K. An antenna 100K' is coupled to the communication circuit 100K. Instead of the communication circuit 100K, a CPU that realizes a communication function may be used. The node 100 is coupled to the nodes 200 and 300 via the communication circuit 100K and the antenna 100K'.

Also, the node 100 includes an input unit 100F and a display unit 100G, too. As the input unit 100F, for example, a keyboard, a pointing device, a touch panel, or the like may be used. As the display unit 100G, for example, a liquid crystal display may be used. Furthermore, the node 100 may include at least one of a hard disk drive (HDD) 100E, an input and output I/F 100H, and a drive device 100I. The CPU 100A, . . . , the drive device 100I, and the communication circuit 100K are coupled to one another via an internal bus 100J. At least the CPU 100A and the RAM 100B cooperate with one another, thereby realizing a computer.

A semiconductor memory 730 is coupled to the input and output I/F 100H. As the semiconductor memory 730, for example, universal serial bus (USB) memory, flash memory, or the like may be used. The input and output I/F 100H reads out a program or data stored in the semiconductor memory 730. The input and output I/F 100H includes, for example, a USB port.

A portable recording medium 740 is inserted in the drive device 100I. As the portable recording medium 740, for example, a removal disk, such as compact disc (CD)-ROM or a digital versatile disc (DVD), may be used. The drive device 100I reads out a program or data stored in the portable recording medium 740.

The network I/F 100D includes, for example, a local area network (LAN) port.

A program stored in the HDD 100E is caused to be stored in the above-described RAM 100B by the CPU 100A. A program recorded in the portable recording medium 740 is caused to be stored in the RAM 100B by the CPU 100A. The CPU 100A executes the stored program, thereby realizing each of various types of functions, which will be described later, also executing each of various types of operations, which will be described later. Note that a program corresponds to a flowchart, which will be described later.

Next, with reference to FIG. 3 to FIG. 7, a function of the node 100 will be described. Note that, basically, each of the above-described nodes 200, 300, and 400 has a similar function to the function of the node 100, and therefore, the description thereof will be omitted.

Figure 5:
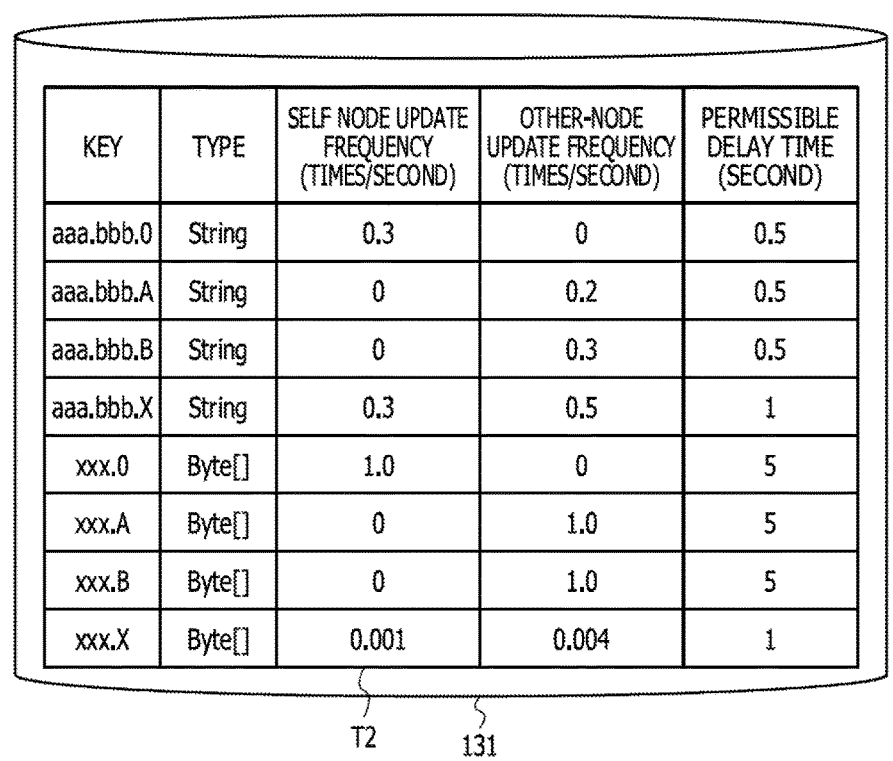
FIG. 5 is a diagram illustrating an example of an update frequency storage unit.
Figure 6:
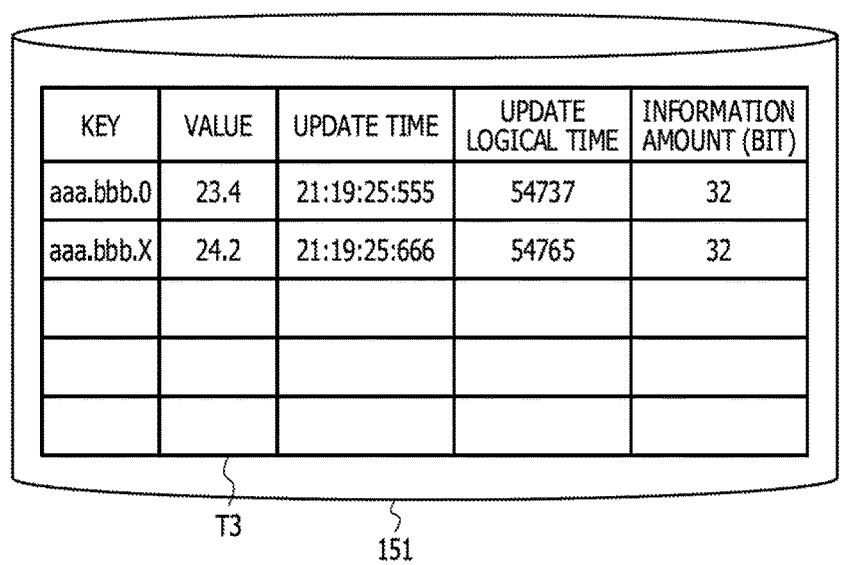
FIG. 6 is a diagram illustrating an example of an untransmitted list storage unit.
Figure 7:
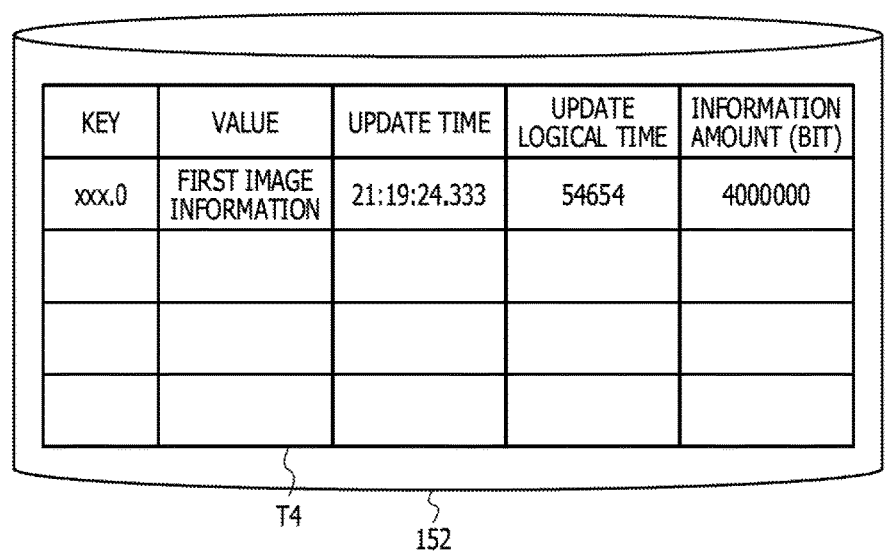
FIG. 7 is a diagram illustrating an example of a during-transmission list storage unit.

FIG. 3 is an exemplary block diagram of the node 100. FIG. 4 illustrates an example of an information storage unit 110. FIG. 5 illustrates an example of an update frequency storage unit 131. FIG. 6 illustrates an example of an untransmitted list storage unit 151. FIG. 7 illustrates an example of a during-transmission list storage unit 152. As illustrated in FIG. 3, the node 100 includes the information storage unit 110, an information processing unit 120, a management unit 130, a communication unit 140, and a control unit 150.

The information storage unit 110 stores shared information that is shared by the nodes 200, 300, and 400, which are communication destinations of the node 100. More specifically, as illustrated in FIG. 4, the information storage unit 110 manages each piece of shared information using a shared information table T1. Each shared information includes, as components, at least a key (KEY), a value (VALUE), a logical time (or a logical clock). The key is identification information that identifies shared information. As illustrated in FIG. 4, shared information may be configured to include the description of the shared information or not so. In FIG. 4, shared information is indicated as a key and value type, but is not limited to the key and value type.

The logical time is used for indicating a processing order relation of between the nodes 100, 200, 300, and 400. For example, when the node 100 transmits shared information, the node 100 causes the logical time at the time of transmission to be included in the shared information and thus transmits the logical time in the shared information, and the nodes 200, 300, and 400 calculate, as a new logical time, a value obtained by adding a predetermined value (for example, a value "1") to the logical time included in the shared information. Therefore, the logical time proceeds in one direction and does not return in an inverse direction.

As for the shared information stored in the information storage unit 110, additional information is added or the shared information is rewritten by the information processing unit 120. The information processing unit 120 is realized by, for example, an application program. For example, the information processing unit 120 regularly acquires sensing information indicating temperature from a temperature sensor that detects the temperature of the CPU 100A (see FIG. 2). When the information processing unit 120 determines that acquisition of sensing information is first acquisition, the information processing unit 120 adds, as a value, the sensing information that has been acquired by generating a key with the logical time to the information storage unit 110. When the information processing unit 120 determines that acquisition of sensing information is second or subsequent acquisition, the information processing unit 120 rewrites the value of shared information including the key with the acquired sensing information. That is, the information processing unit 120 regularly updates the shared information (more specifically, the value). Note that, although details will be described later, the shared information is updated also by shared information transmitted by the nodes 200, 300, and 400.

As illustrated in FIG. 3, the management unit 130 includes the update frequency storage unit 131 and an update frequency management unit 132. The update frequency storage unit 131 stores an update frequency information related to an shared information update frequency. More specifically, as illustrated in FIG. 5, the update frequency storage unit 131 manages each piece of update frequency information, based on an update frequency information table T2. Each piece of update frequency information includes, as components, a key, a type, a self-node update frequency, an other-node update frequency, and permissible delay time. The key is identification information that identifies shared information, as described above. The type indicates a key type. For example, the type "String" indicates a character string, and the type "Byte [ ]" indicates a byte array. In this embodiment, the self-node indicates the node 100, and the other nodes indicate the nodes 200, 300, and 400.

The self-node update frequency indicates a frequency with which each shared information (more specifically, the value) stored in the information storage unit 110 has been updated by the information processing unit 120. The other-node update frequency indicates a frequency with which shared information stored in the information storage unit 110 has been updated by shared information transmitted from the nodes 200, 300, and 400. Each of the update frequencies is the number of times of an update is performed per second.

For example, the update frequency "0.3" indicates that the shared information is updated 0.3 times per second, that is, once every three to four seconds. That is, in FIG. 5, it is indicated that the shared information of the key "aaa.bbb.O" is updated by the information processing unit 120 at a rate of once every three to four seconds and has not been updated by shared information transmitted from the other nodes 200, 300, and 400.

For example, the update frequency "0.2" indicates that the shared information is updated at a rate of 0.2 times per second, that is, once every five seconds. That is, in FIG. 5, the shared information of the key "aaa.bbb.A" is updated at a rate of once every five seconds by shared information transmitted from one of the other nodes 200, 300, and 400 and has not been updated by the information processing unit 120.

The permissible delay time is a type of a static policy that sets an operation rule of the communication network NW and, in this embodiment, indicates a permissible limit of delay time. The delay time is time by which updating of shared information stored in the nodes 200, 300, and 400, which are communication destinations of the node 100 is delayed. Therefore, the permissible delay time is time used for determining up to how much time by which the update may be delayed. The permissible delay time may be set for each piece of shared information, based on the operation rule of the communication network NW.

The update frequency management unit 132 manages the self-node update frequency and the other-node update frequency, which have been described above. More specifically, when the shared information stored in the information storage unit 110 is updated, the update frequency management unit 132 detects the update of the shared information and calculates an update frequency of the shared information. The update frequency management unit 132 uses the calculated update frequency and updates, for of the corresponding shared information, the self-node update frequency and the other-node update frequency.

The communication unit 140 transmits shared information and receives shared information transmitted from the nodes 200, 300, and 400. When the communication unit 140 completes transmission of shared information that has been transmitted from a synchronization control unit 154, which will be described later, the communication unit 140 issues a transmission completion notification and transmits the transmission completion notification to the synchronization control unit 154.

The control unit 150 controls transmission of shared information to a communication destination, based on the self-node update frequency, the other-node update frequency, and the state of a communication with a communication destination. The communication state includes a stable communication state and an unstable communication state. The control unit 150 includes the untransmitted list storage unit 151, the during-transmission list storage unit 152, a communication state management unit 153, and the synchronization control unit 154.

The untransmitted list storage unit 151 stores untransmitted information including shared information before transmission is started. More specifically, as illustrated in FIG. 6, the untransmitted list storage unit 151 puts each untransmitted information in a list, based on an untransmitted table T3, and manages untransmitted information. Each piece of untransmitted information includes, as components, a key, a value, update time, update logical time, and an information amount. The key and the value have been already described, and therefore, the description thereof will be omitted. The update time is actual time at which the value was updated and is registered in an HHMMSSFFF format. The update logical time is logical time at which the value was updated. The information amount indicates the amount of the value in units of bit. The information amount is calculated by the synchronization control unit 154, based on the value. The update time, the update logical time, and the information amount are registered in untransmitted information by the synchronization control unit 154.

The during-transmission list storage unit 152 stores shared information for which transmission is to be started or shared information in a during-transmission state. More specifically, as illustrated in FIG. 7, the during-transmission list storage unit 152 manages each piece of transmission information, based on a transmission information table T4. Components of transmission information are the same as the components of untransmitted information, which have been described above, and therefore, the description thereof will be omitted.

The communication state management unit 153 regularly or randomly manages the state of a communication with a communication destination for each communication target. More specifically, the communication state management unit 153 accesses the communication unit 140 to acquire the communication state. The communication state management unit 153 outputs the acquired communication state to the synchronization control unit 154. Note that, as the communication state, for example, a communication throughput (bit/second) is used.

The synchronization control unit 154 controls synchronization between the node 100 as the self-node and the nodes 200, 300, and 400 as the other-nodes. More specifically, the synchronization control unit 154 acquires the self-node update frequency and the other-node update frequency from the update frequency storage unit 131. Also, the synchronization control unit 154 acquires untransmitted information from the untransmitted list storage unit 151. The synchronization control unit 154 controls transmission of shared information to a transmission destination, based on each of the update frequencies of the self-node and the other-nodes, which have been acquired, the update time or the update logic time included in untransmitted information, and the communication state output from the communication state management unit 153. The synchronization control unit 154 may be configured to further control transmission of shared information to a communication destination using the information amount included in the untransmitted information. The synchronization control unit 154 may be configured to acquire the permissible delay time from the update frequency storage unit 131 and control transmission of shared information to a communication destination using the acquired permissible delay time.

For example, when a plurality of pieces of shared information is updated, the synchronization control unit 154 acquires, as a transmission target, pieces of shared information obtained by duplicating the plurality of pieces of shared information from the information storage unit 110, generates untransmitted information including the acquired shared information, and stores the untransmitted information in the untransmitted list storage unit 151. When there is a free space in which transmission information including the shared information may be stored in the during-transmission list storage unit 152, the synchronization control unit 154 calculates, for each piece of shared information, the level of contribution that indicates how much the shared information contributes to updating of shared information of a communication destination.

The synchronization control unit 154 moves the plurality of pieces of shared information from the untransmitted list storage unit 151 to the during-transmission list storage unit 152 in the descending order of the degree of contribution which has been calculated. More specifically, the synchronization control unit 154 generates transmission information including the shared information and stores the generated transmission information in the during-transmission list storage unit 152, and also, removes the untransmitted information including the shared information from the untransmitted list storage unit 151. Thus, the shared information substantially is moved from the untransmitted list storage unit 151 to the during-transmission list storage unit 152. The synchronization control unit 154 transmits the shared information to the communication unit 140 in accordance with the order of transmission information which is managed by the transmission information table T4. When the communication unit 140 receives the shared information, the communication unit 140 transmits the shared information to the transmission destination.

Also, when the state of a communication with a communication destination is less stable than a predetermined communication state (that is, unstable), the synchronization control unit 154 reduces transmission of shared information the level of contribution of which is less than a predetermined value. Specifically, the synchronization control unit 154 stops moving the shared information to the during-transmission list storage unit 152. In addition, although details will be described later, the synchronization control unit 154 returns the shared information from the during-transmission list storage unit 152 to the untransmitted list storage unit 151, thereby reducing transmission of the shared information.

Subsequently, with reference to FIG. 8 to FIG. 13A and FIG. 13B, an operation of the node 100 will be described. Note that an operation of each of the nodes 200, 300, and 400 is similar to the operation of the node 100, and therefore, the description thereof will be omitted.

Figure 8:
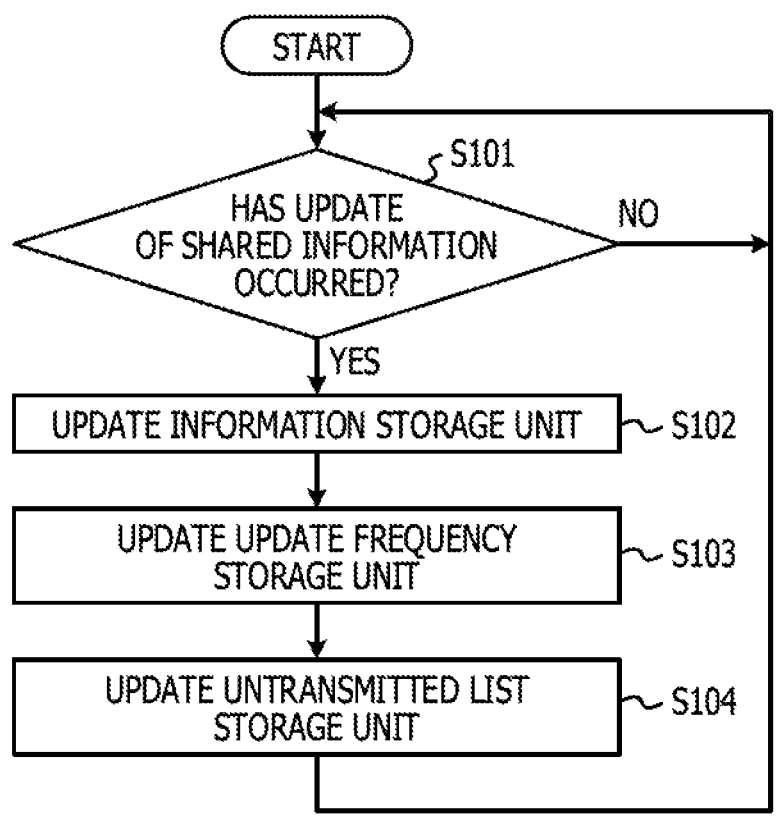
FIG. 8 is a flowchart illustrating an example of shared information update processing.

FIG. 8 is a flowchart illustrating an example of shared information update processing. More specifically, FIG. 8 illustrates processing that is executed when the information processing unit 120 updates shared information.

First, as illustrated in FIG. 8, the information processing unit 120 continues to stand by until an update of shared information occurs (NO in Step S101) and, when an update of shared information occurs (YES in Step S101), the information processing unit 120 updates the information storage unit 110 (Step S102). For example, when the information processing unit 120 acquires sensing information, the information processing unit 120 updates the value and logical time of the corresponding key.

When the processing of Step S102 is completed, subsequently, the update frequency management unit 132 updates the update frequency storage unit 131 (Step S103). For example, when the information storage unit 110 is updated, the update frequency management unit 132 detects update of the information storage unit 110 and updates the update frequency storage unit 131. Specifically, the update frequency management unit 132 updates the self-node update frequency.

When the processing of Step S103 is completed, subsequently, the synchronization control unit 154 updates the untransmitted list storage unit 151 (Step S104). For example, if there is untransmitted information including the same key as the key associated with the updated value in the untransmitted list storage unit 151, the synchronization control unit 154 replaces the value, update time, update logic time, and information amount of the key. On the other hand, if there is not the same key as the key associated with the updated value in the untransmitted list storage unit 151, the synchronization control unit 154 adds, as untransmitted information, the key, the value, the update logic time, the update time, and the information amount. When the processing of Step S104 is completed, the process returns to Step S101. As described above, when an update of the shared information occurs, the shared information, the update frequency information, and the untransmitted information are updated.

Figure 9:
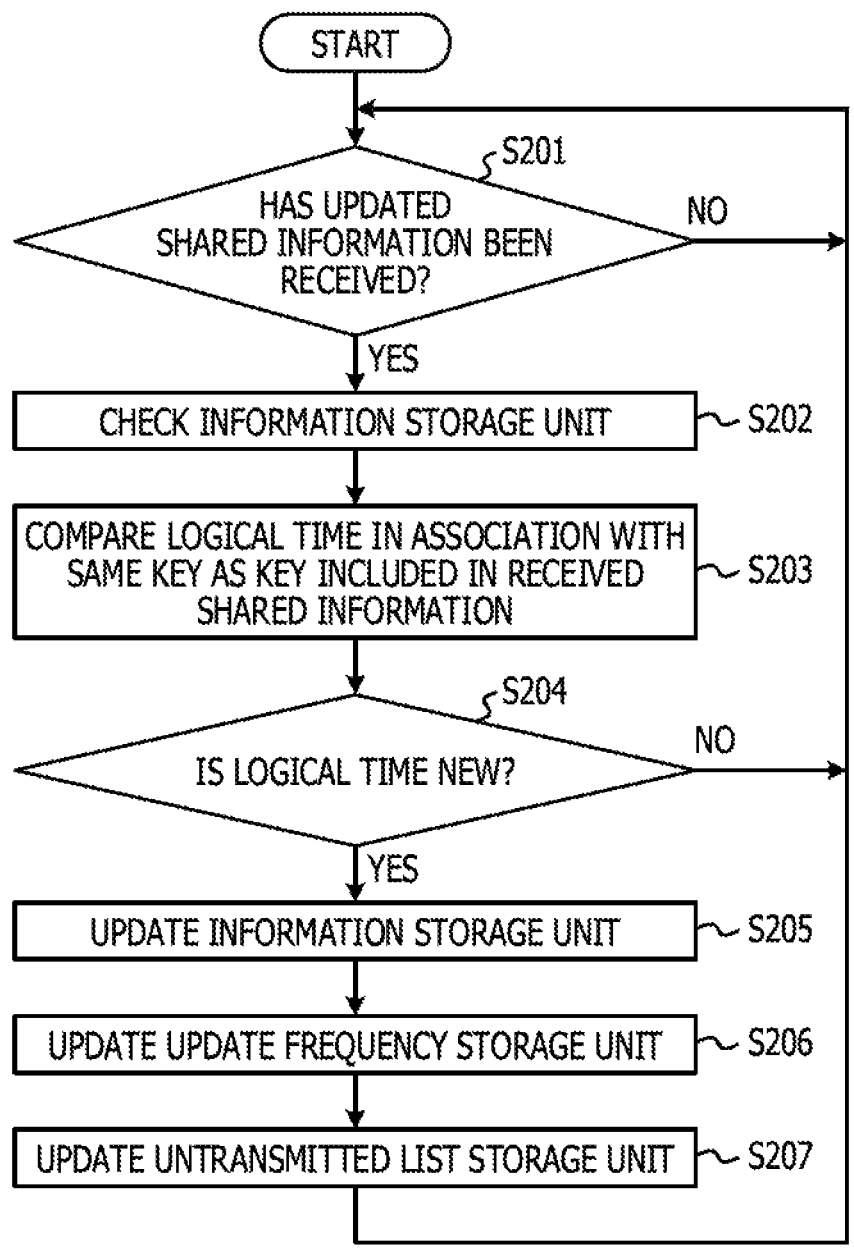
FIG. 9 is a flowchart illustrating another example of shared information update processing.

FIG. 9 is a flowchart illustrating another example of shared information update processing. More specifically, FIG. 9 illustrates processing that is executed when the synchronization control unit 154 receives shared information. As illustrated in FIG. 9, the synchronization control unit 154 continues to stand by until the synchronization control unit 154 receives updated shared information (NO in Step S201). More specifically, when the communication unit 140 receives shared information transmitted from one of the nodes 200, 300, and 400, the communication unit 140 transmits the received shared information to the synchronization control unit 154.

When the synchronization control unit 154 receives updated shared information (YES in Step S201), the synchronization control unit 154 checks the information storage unit 110 (Step S202) and compares the logical time of shared information that has the same key as the key included in the received shared information (Step S203). If the synchronization control unit 154 determines, as a result of comparison, that the logical time is not new (NO in Step S204), the process returns to Step S201. Therefore, various types of updates, which will be described later, are not executed. On the other hand, if the synchronization control unit 154 determines, as a result of comparison, that the logical time is new (YES in Step S204), the synchronization control unit 154 updates the information storage unit 110 (Step S205). For example, the synchronization control unit 154 updates the value of shared information that has the same key as the key included in the received shared information to a value included in the received shared information.

When the processing of Step S205 is completed, subsequently, the update frequency management unit 132 updates the update frequency storage unit 131 (Step S206). As described above, when the information storage unit 110 is updated, the update frequency management unit 132 detects an update of the information storage unit 110 and updates the update frequency storage unit 131. Specifically, the update frequency management unit 132 updates the other-node update frequency.

When the processing of Step S206 is completed, subsequently, the synchronization control unit 154 updates the untransmitted list storage unit 151 (Step S207). For example, if there is the same key as the key associated with the updated value in the untransmitted list storage unit 151, the synchronization control unit 154 removes untransmitted information including the key. On the other hand, if there is not the same key as the key associated with the updated value in the untransmitted list storage unit 151, the synchronization control unit 154 adds, as untransmitted information, the key, the value, the update logical time, the update time, and the information amount. When the processing of Step S207 is completed, the process returns to Step S201. Thus, if the received shared information is newer than shared information that is managed by itself, the shared information, the update frequency information, and the untransmitted information are updated.

Next, with reference to FIG. 10, an operation of the communication unit 140 will be described.

Figure 10:
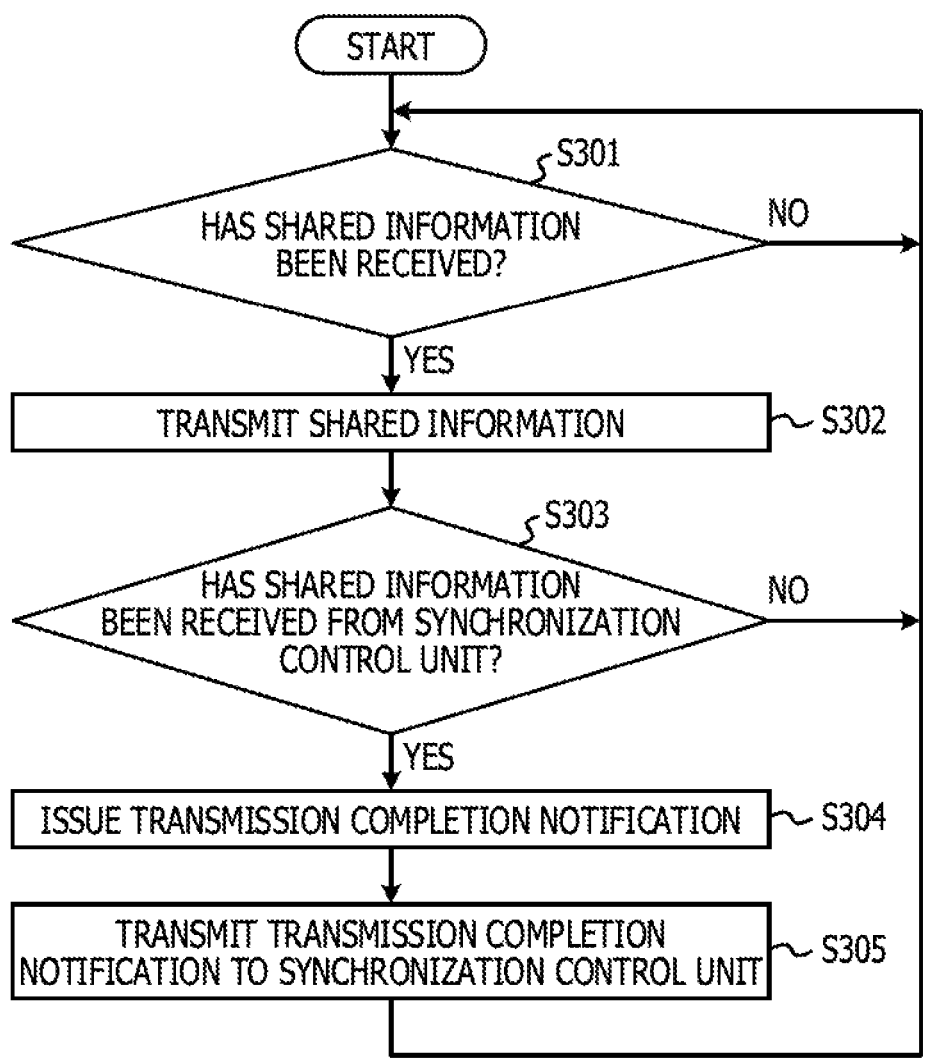
FIG. 10 is a flowchart illustrating an example of processing of a communication unit.

FIG. 10 is a flowchart illustrating an example of processing of the communication unit 140. The communication unit 140 continues to stand by until the communication unit 140 receives shared information (NO in Step S301) and, when the communication unit 140 receives shared information (YES in Step S301), the communication unit 140 transmits the shared information (Step S302). More specifically, when the communication unit 140 receives the shared information transmitted from the synchronization control unit 154, the communication unit 140 transmits the received shared information to the nodes 200, 300, and 400. On the other hand, when the communication unit 140 receives shared information transmitted from the nodes 200, 300, and 400, the communication unit 140 transmits the received shared information to the synchronization control unit 154.

In this case, when the processing of Step S302 is completed, the communication unit 140 determines whether or not the synchronization control unit 154 has received shared information from the synchronization control unit 154 (Step S303). If the synchronization control unit 154 has received shared information from the synchronization control unit 154 (YES in Step S303), the communication unit 140 issues a transmission completion notification (Step S304) and transmits the transmission completion notification to the synchronization control unit 154 (Step S305). The transmission completion notification includes one of a success of transmission and a failure of transmission. When the processing of Step S305 is completed, the process proceeds to Step S301. On the other hand, if the synchronization control unit 154 has received shared information from the node 400 (NO in Step S303), the processing of Step S304 and S305 is skipped, and the process returns to S301.

Next, with reference to FIG. 11, an example of transmission management processing that is executed by the synchronization control unit 154 will be described.

Figure 11:
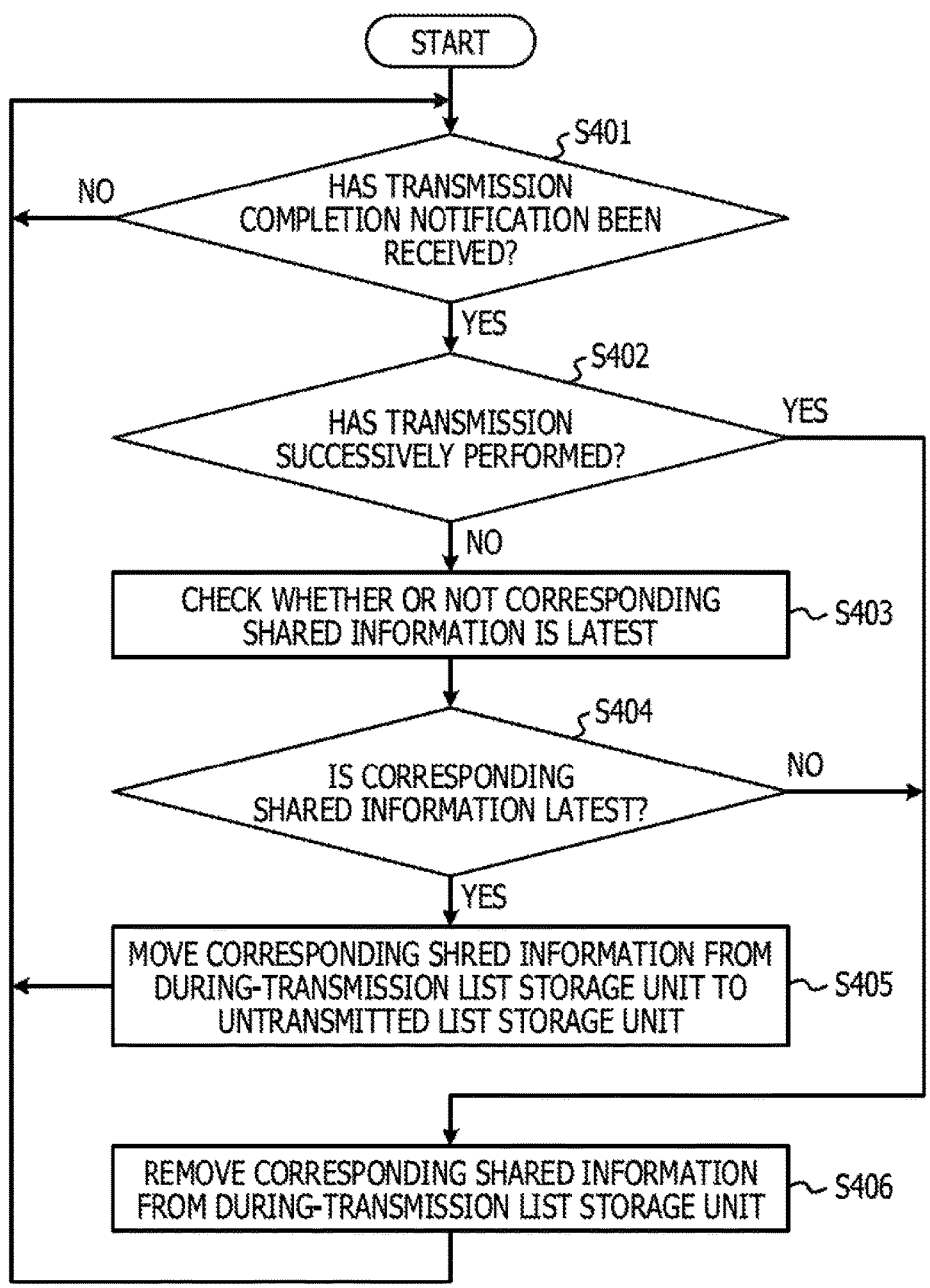
FIG. 11 is a flowchart illustrating an example of transmission management processing performed by a synchronization control unit.

FIG. 11 is a flowchart illustrating an example of transmission management processing that is executed by the synchronization control unit 154. First, the synchronization control unit 154 continues to stand by until the synchronization control unit 154 receives a transmission completion notification (NO in Step S401). When the synchronization control unit 154 receives a transmission completion notification (YES in Step S401), subsequently, the synchronization control unit 154 determines whether or not transmission has been successfully performed (Step S402). In this case, as described above, the transmission completion notification includes one of a success of transmission and a failure of transmission. For example, a case where a communication state is unstable and therefore the communication breaks during the communication corresponds to a failure of transmission.

If the synchronization control unit 154 determines, based on the transmission completion notification, that transmission has failed (NO in Step S402), the synchronization control unit 154 checks whether or not the corresponding shared information transmission of which has failed is the latest (Step S403). Specifically, the synchronization control unit 154 accesses the information storage unit 110, compares the logical time of the corresponding shared information and the logical time of shared information of the information storage unit 110 which has the same key as the key of the shared information with one another, and checks whether or not the corresponding shared information is the latest.

If the synchronization control unit 154 determines that the corresponding shared information is the latest (YES in Step S404), the synchronization control unit 154 moves the corresponding shared information from the during-transmission list storage unit 152 to the untransmitted list storage unit 151 (Step S405). Therefore, the corresponding shared information is a target of calculation of the level of contribution. When the processing of Step S405 is completed, the process returns to Step S401.

On the other hand, if the synchronization control unit 154 determines, based on the transmission completion notification, that transmission has been successfully performed (YES in Step S402), or if the synchronization control unit 154 determines that the corresponding shared information is not the latest (NO in Step S404), the synchronization control unit 154 removes the corresponding shared information from the during-transmission list storage unit 152 (Step S406). More specifically, the synchronization control unit 154 removes transmission information including the corresponding shared information from the during-transmission list storage unit 152. That is, if transmission has been successfully performed, the transmission information is not desired to be managed any more, and therefore, the synchronization control unit 154 removes the transmission information. Also, in a case where the shared information is not the latest, even when the transmission information is transmitted, the transmission information does not contribute to updating of the nodes 200, 300, and 400, and therefore, the synchronization control unit 154 removes the transmission information. When the processing of Step S406 is completed, the process returns to Step S401.

Next, with reference to FIG. 12, FIG. 13A, and FIG. 13B, an example of transmission control processing that is executed by the synchronization control unit 154 will be described.

Figure 12:
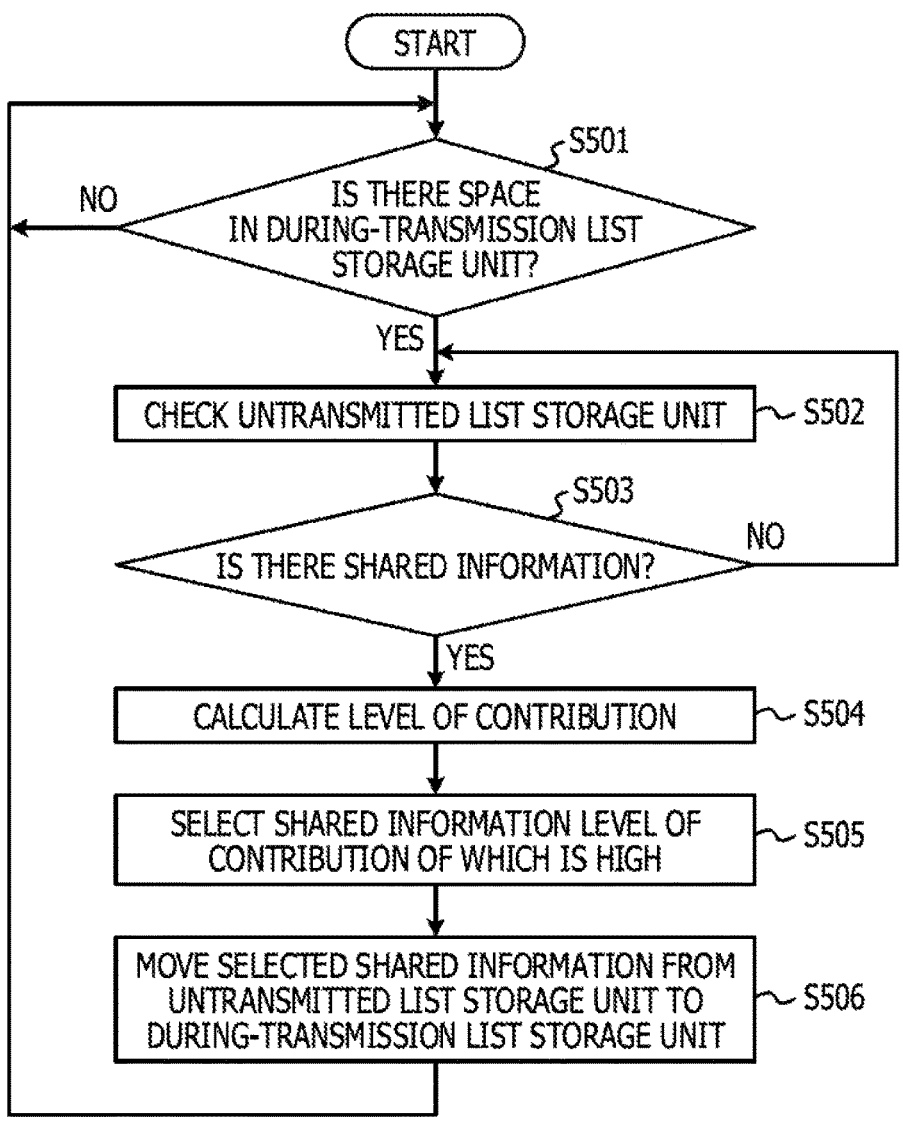
FIG. 12 is a flowchart illustrating an example of transmission control processing performed by a synchronization control unit.
Figure 13A:
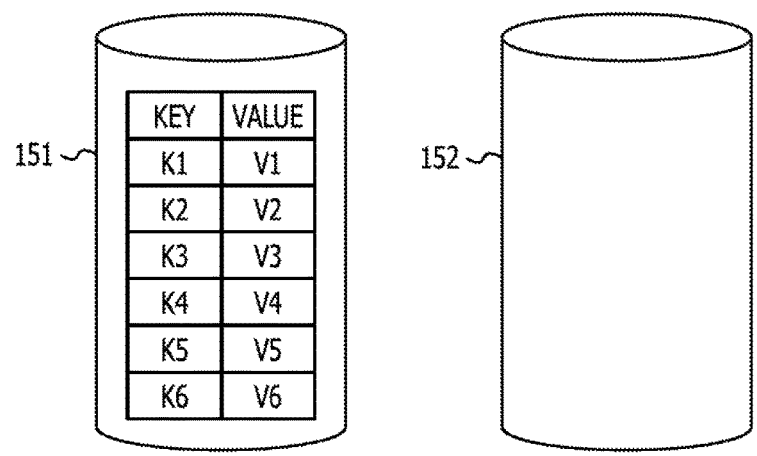
FIGS. 13A and 13B are diagrams each illustrating an example of transmission control of shared information in accordance with the level of contribution.
Figure 13B:
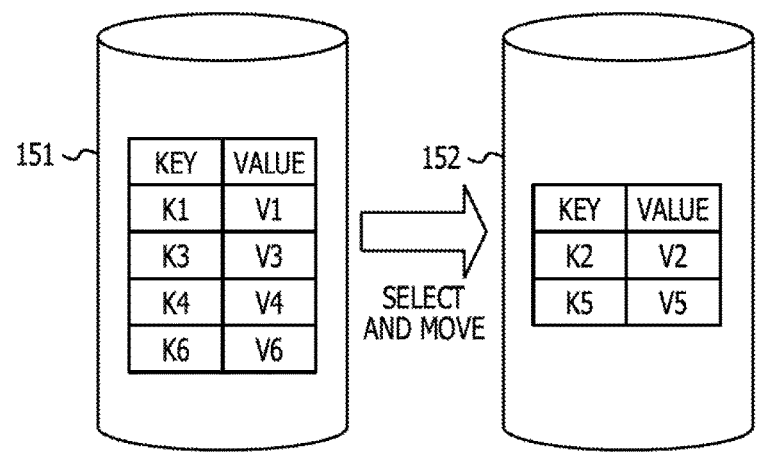

FIG. 12 is a flowchart illustrating an example of transmission control processing that is performed by the synchronization control unit 154. FIGS. 13A and 13B are diagrams each illustrating an example of shared information transmission control in accordance with the level of contribution. Note that the synchronization control unit 154 executes the transmission management processing illustrated in FIG. 11 and the transmission control processing illustrated in FIG. 12 in parallel. Also, in FIGS. 13A and 13B, the update time, the update logical time, and the information amount which are parts of untransmitted information and transmission information are omitted.

First, as illustrated in FIG. 12, the synchronization control unit 154 determines whether or not there is a space in the during-transmission list storage unit 152 (Step S501) and, if there is not a space, the synchronization control unit 154 stands by until a space is made (NO in Step 501). That is, the synchronization control unit 154 stands by for storing transmission information until a capacity with which transmission information may be stored is made.

If the synchronization control unit 154 determines that there is a space in the during-transmission list storage unit 152 (YES in Step S501), subsequently, the synchronization control unit 154 checks the untransmitted list storage unit 151 (Step S502). If there is not shared information (NO in Step S503), the synchronization control unit 154 causes the process to return to Step S502 and checks the untransmitted list storage unit 151. That is, up to when shared information is updated and untransmitted information including shared information obtained by duplicating the shared information is stored in the untransmitted list storage unit 151, the synchronization control unit 154 checks the untransmitted list storage unit 151.

If the synchronization control unit 154 determines that there is shared information in the untransmitted list storage unit 151 (YES in Step S503), the synchronization control unit 154 calculates the level of contribution (Step S504). More specifically, as illustrated in FIG. 13A, if there is a plurality of pieces of untransmitted information in the untransmitted list storage unit 151, when shared information included in the untransmitted information is transmitted, the synchronization control unit 154 determines how much the shared information contributes updating of shared information of a transmission destination. Note that a specific method for calculating the level of contribution will be described later.

When the synchronization control unit 154 calculates the level of contribution, subsequently, the synchronization control unit 154 selects the shared information the level of contribution of which is high (Step S505), and the synchronization control unit 154 moves the selected shared information from the untransmitted list storage unit 151 to the during-transmission list storage unit 152 (Step S506). More specifically, as illustrated in FIG. 13B, the synchronization control unit 154 generates transmission information including the shared information the level of contribution of which is equal to or higher than a predetermined value, stores the generated transmission information in the during-transmission list storage unit 152, and then, removes the untransmitted information including the shared information from the untransmitted list storage unit 151. The transmission information is stored in the during-transmission list storage unit 152, and therefore, the shared information included in the transmission information is transmitted. That is, in FIG. 13B, each of pieces of shared information of keys "K2" and "K5", the level of contribution of which is determined high, is transmitted. When the processing of Step S506 is completed, the process returns to Step S501 again.

Next, with reference to FIG. 14 to FIG. 18, the above-described method for calculating the level of contribution will be described.

Figure 14:
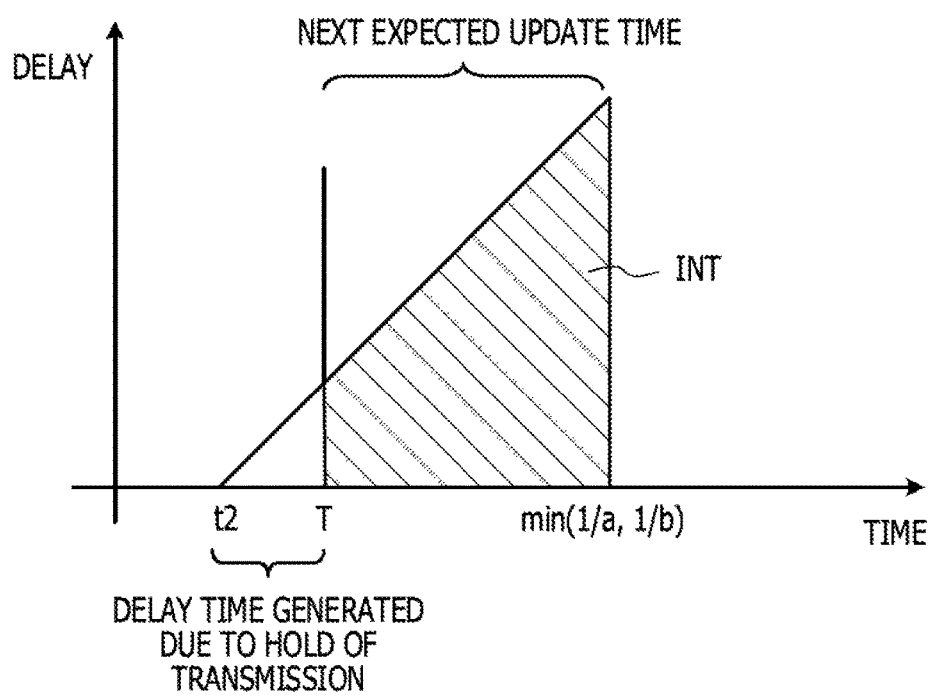
FIG. 14 is a graph illustrating an example of a method for calculating an integrated value which is used for determining the level of contribution.

FIG. 14 illustrates an example of a method for calculating an integrated value INT which is used for determining the level of contribution. First, as illustrated in FIG. 14, the synchronization control unit 154 calculates, as delay time generated due to hold of transmission, a time period from immediately preceding update occurrence time t2 for the shared information to final update time t1 that is current time T. In this case, the final update time t1 corresponds to update time included in untransmitted information. The update occurrence time t2 is time that is to be recorded when transmission of the shared information is put on hold because of a predetermined cause. Examples of the predetermined cause include, for example, a case where a communication state is unstable or the like. That is, in a communication state in which a communication throughput is less than a predetermined value and therefore there is a probability that transmission of shared information is interrupted in the middle, the transmission of the shared information is put on hold and time of the interruption is recorded.

On the other hand, a and b in next expected update time min (1/a, 1/b) indicate the self-node update frequency (times/second) and the other-node update frequency (times/second), respectively. For example, each of the update frequencies a and b (times/second) indicates that it is expected that an update occurs after the corresponding one of 1/a and 1/b seconds. That is, the synchronization control unit 154 determines the earliest time, among time when the shared information is updated by the information processing unit 120 and time when the shared information is updated by shared information transmitted from the corresponding one of the nodes 200, 300, and 400, as next expected update time a start point of which is the current time T. Then, the synchronization control unit 154 calculates, as a next expected update time period, a time period from the current time T to the next expected update time.

Note that, the higher each of the update frequencies a and b is, the higher frequency the shared information is updated with. In other words, a time period from an update to a next update is reduced, and obsolescence of the shared information is accelerated. Even when shared information that is quickly obsoleted is transmitted, the shared information is updated soon again, and therefore, when a communication state is unstable, the synchronization control unit 154 reduces transmission of such shared information.

Also, if the time when the shared information is updated by the shared information transmitted from the nodes 200, 300, and 400 comes before the time when the shared information is updated by the information processing unit 120, it is presumed that, even when the shared information updated by the information processing unit 120 is transmitted, the level of contribution of the shared information to the nodes 200, 300, and 400 is low. Therefore, if a communication state is unstable, the synchronization control unit 154 also reduces transmission of such shared information. Also, for shared information the information amount of which is large, it takes a large amount of time to update the shared information of the nodes 200, 300, and 400, and therefore, when a communication state is unstable, the synchronization control unit 154 reduces transmission of the shared information.

That is, in FIG. 14, the synchronization control unit 154 expects the integrated value INT that corresponds to a delay, which is a cause for interrupting updating shared information of a communication destination for each piece of shared information, selects shared information such that the integrated value INT is minimalized at all times, and transmits the selected shared information. As a result, shared information the integrated value INT of which is small is determined to be shared information the level of contribution to updating of which is low, and therefore, is not selected. On the other hand, the shared information the integrated value INT of which is large is determined to be shared information the level of contribution to updating of which is high, and therefore, is selected and transmitted. That is, the integrated value INT corresponds to the level of contribution to updating. In this case, the integrated value INT is calculated based on the following calculation expression in accordance with the area of a trapezoid.

$$INT=[\text{upper base } (T-t2)+\text{lower base } \{\min(1/a,1/b) \times (T-t2)\}] \times \text{height } \min(1/a,1/b) \times 0.5 = \{\min(1/a,1/b) \times 0.5 + (T-t2)\} \times \min(1/a,1/b)$$

Therefore, the synchronization control unit 154 determines that selection of shared information that is performed such that the integrated value INT is minimized is selection of shared information the level of contribution of which is the highest, moves the selected shared information from the untransmitted list storage unit 151 to the during-transmission list storage unit 152, and transmits the shared information. Also, if there is a space in the during-transmission list storage unit 152, the synchronization control unit 154 moves shared information the level of contribution of which is the second highest from the untransmitted list storage unit 151 to the during-transmission list storage unit 152 and transmits the shared information. By repeating the above-described processing, the synchronization control unit 154 transmits shared information in the descending order of the level of contribution. As a result, transmission of shared information the level of contribution of which is low is reduced.

Figure 15:
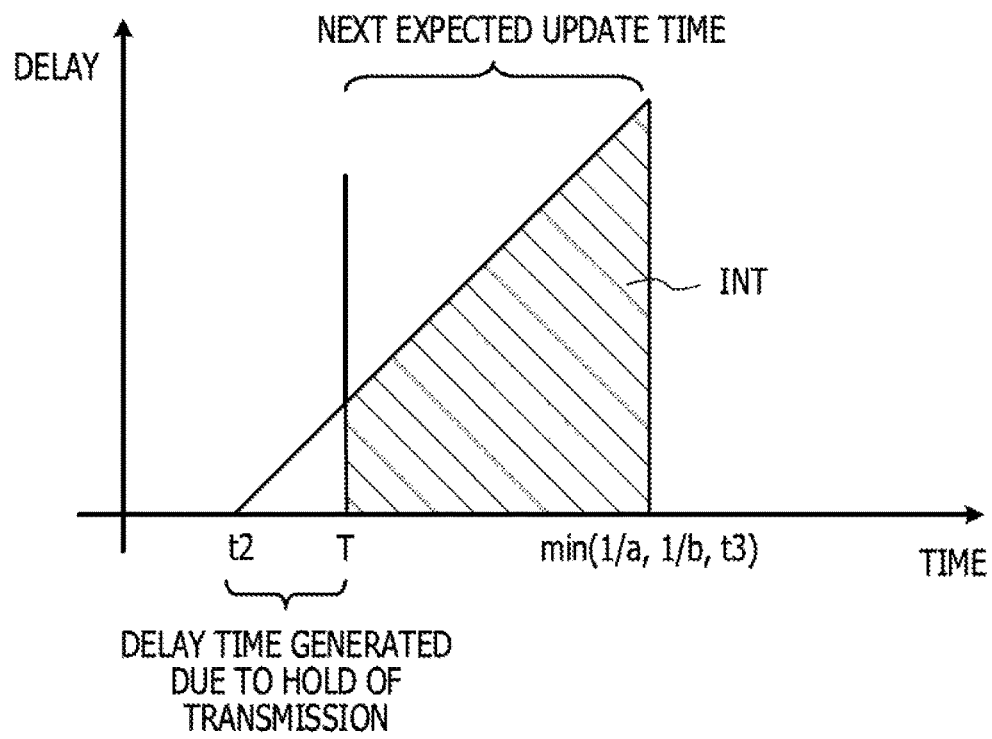
FIG. 15 is a graph illustrating another example of a method for calculating an integrated value which is used for determining the level of contribution.

FIG. 15 illustrates another example of a method for calculating the integrated value INT which is used for determining the level of contribution. In FIG. 15, in comparison to FIG. 14, the integrated value INT is calculated using next transmission determination time t3. For example, if the synchronization control unit 154 determines whether or not shared information is to be transmitted again after time t3 has elapsed from the current time T, the next expected update time min (1/a, 1/b) is min (1/a, 1/b, t3). In this case, the integrated INT is calculated based on the following calculation expression.

$$INT=\{\min(1/a,1/b,t3) \times 0.5 + (T-t2)\} \times \min(1/a,1/b,t3)$$

Figure 16:
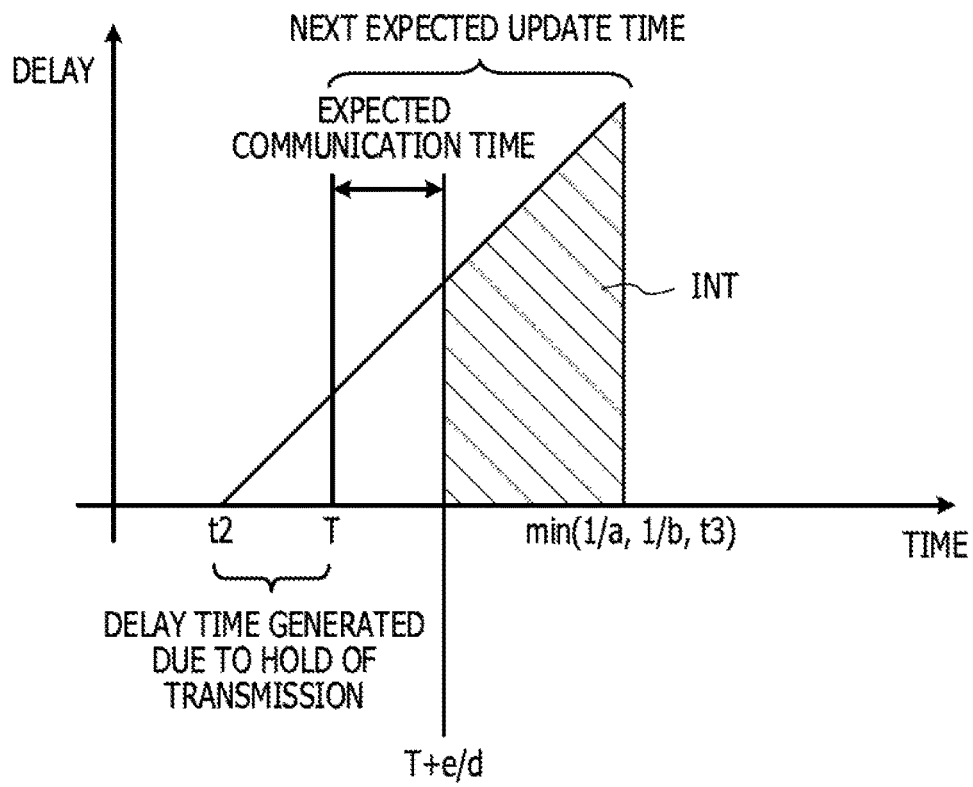
FIG. 16 is a graph illustrating another example of a method for calculating an integrated value which is used for determining the level of contribution.

FIG. 16 illustrates another example of a method for calculating the integrated value INT which is used for determining the level of contribution. In FIG. 16, in comparison to FIG. 15, the integrated value INT is calculated using a communication state d and an information amount e. Specifically, an expected communication time e/d based on the communication state d and the information amount e is taken into account, and thus, the integrated value INT is calculated. In this case, the integrated value INT is calculated based on the following calculating expression. Note that, if a result of a calculation of min (1/a, 1/b, t3)−e/d is a negative value, INT=0 is achieved.

$$INT=[\{\min(1/a,1/b,t3)+e/d\} \times 0.5 + (T-t2)] \times \max[\{\min(1/a,1/b,t3)-e/d\},0]$$

Figure 17:
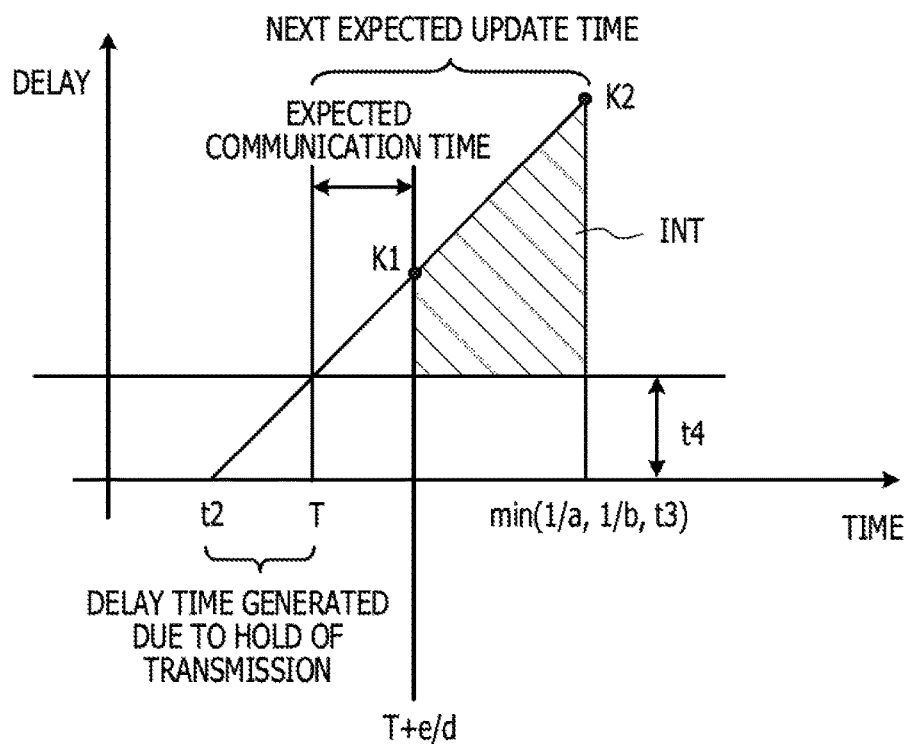
FIG. 17 is a graph illustrating another example of a method for calculating an integrated value which is used for determining the level of contribution.
Figure 18:
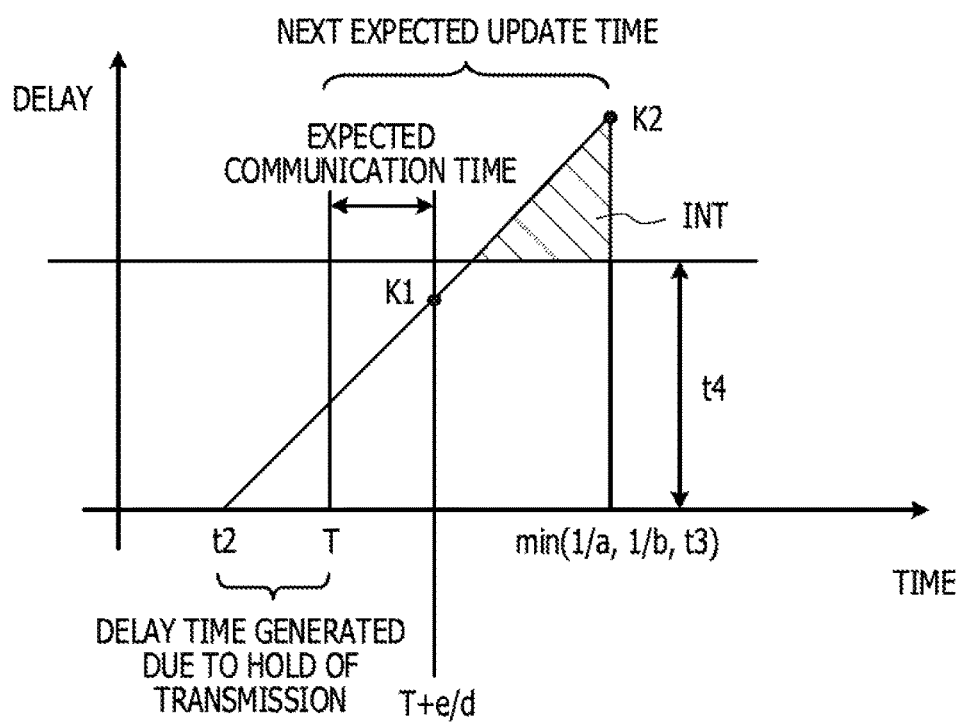
FIG. 18 is a graph illustrating another example of a method for calculating an integrated value which is used for determining the level of contribution.

Each of FIG. 17 and FIG. 18 illustrates another example of a method for calculating the integrated value INT which is used for determining the level of contribution. In FIG. 17 and FIG. 18, in comparison to FIG. 16, the integrated value INT is calculated using a permissible delay time t4. In this case, classification is performed depending on the magnitude of the permissible delay time t4, and the integrated value INT is calculated. Specifically, classification into three cases, that is, a case where, as illustrated in FIG. 17, the permissible time t4 is a value that is equal to or smaller than a value at a coordinate K1, a case where, as illustrated in FIG. 18, the permissible time t4 is a value that is larger than the value at the coordinate K1 and smaller than a value at a coordinate K2, and a case where the permissible time t4 is a value that is equal to or larger than the value at the coordinate K2, is performed.

First, as illustrated in FIG. 17, if the permissible time t4 is a value equal to or lower than the value at the coordinate K1, the integrated value INT is calculated based on the following calculation expression. Note that a delay at the coordinate K1 is expressed by (T−t2)+e/d.

$$INT=[\{\min(1/a,1/b,t3)+e/d\} \times 0.5+(T-t2)-t4] \times \max[\{\min(1/a,1/b,t3)-e/d\},0]$$

Next, as illustrated in FIG. 18, if the permissible delay time t4 is a value larger than the value at the coordinate K1 and smaller than the value at the coordinate K2, the integrated INT is calculated based on the following calculation expression. Note that a delay at the coordinate K2 is expressed by (T−t2)+min(1/a, 1/b, t3).

$$INT=[\{\min(1/a,1/b,t3)+(T-t2)-t4\} \times 0.5] \times \{(T-t2)+\min(1/a,1/b,t3)-t4\}$$

Lastly, if the permissible delay time t4 is a value that is equal to or larger than the value at the coordinate K2, an area is not formed, and therefore, the integrated value INT is calculated to be 0.

As described above, the node 100 includes the information storage unit 110 that stores shared information that is shared with a communication destination, the management unit 130 that manages the self-node update frequency and the other-node update frequency by which the shared information has been updated, and the control unit 150 that controls, based on the self-node and other-node update frequencies and the state of a communication with the communication destination, transmission of the shared information to the communication destination. Thus, the transmission amount of information that is shared with the communication destination may be adjusted in accordance with the state of a communication with the communication destination.

Although an embodiment has been described in detail above, the present disclosure is not limited to a specific embodiment and various modifications and changes may be made to the embodiment without departing from the scope of the present disclosure as set forth in the claims. For example, the permissible delay time t4 may be applied to an embodiment in which the expected communication time e/d is not used.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment of the present invention has been described in detail, it should be understood that the various changes, substitutions, and alterations could be made hereto without departing from the spirit and scope of the invention.

What is claimed is:

1. An information processing system comprising:
a first information processing device including a first memory and a first processor coupled to the first memory; and
a second information processing device including a second memory and a second processor coupled to the second memory, the second information processing device being configured to communicate with the first information processing device, wherein
the first processor is configured to:
acquire first frequency information indicating a first frequency at which first data stored in the first memory has been updated,
acquire second frequency information indicating a second frequency at which the first data stored in the first memory has been updated due to an update of second data stored in the second memory,
determine, when the first data stored in the first memory has been updated, whether a notification indicating that the first data stored in the first memory has been updated is to be transmitted to the second information processing device, based on the first frequency information, the second frequency information, and a state of a communication between the first information processing device and the second information processing device, and
transmit, when it is determined that the notification is to be transmitted to the second information processing device, the notification to the second information processing device, and
the second processor is configured to update the second data stored in the second memory, based on the notification.

2. The information processing system according to claim 1 wherein
the first processor is configured to determine, when the first data stored in the first memory is updated not due to the update of the second data stored in the second memory, whether the notification is to be transmitted.

3. The information processing system according to claim 1, wherein
the communication state is a communication throughput between the first information processing device and the second information processing device.

4. The information processing system according to claim 1, wherein
the first processor is configured to:
specify a level at which the notification related to the first data is desired to be transmitted, and
transmit the notification when the level is higher than a first value, wherein
the level is set such that, when at least one of the first frequency and the second frequency becomes higher, the level becomes lower.

5. The information processing system according to claim 4, wherein
the first processor is configured not to transmit the notification, when the communication state is unstable and the level is equal to or lower than the first value.

6. The information processing system according to claim 3, wherein
the first processor is configured to:
specify an elapsed time from an update of the first data,
specify, based on the first frequency and the second frequency, expected update time at which at least one of the first data and the second data is to be updated,
specify, based on the elapsed time and the expected update time, an integrated value of the elapsed time, and
determine, based on the integrated value, whether the notification is to be transmitted to the second information processing device.

7. The information processing system according to claim 6, wherein
the first processor is configured to specify the integrated value, based on the communication throughput and a data amount of the first data.

8. The information processing system according to claim 6, wherein
the first processor is configured to specify the integrated value, based on a permissible value of the elapsed time.

9. A method of processing information using a first information processing device including a first memory and a second information processing device including a second memory, the second information processing device being configured to communicate with the first information processing device, the method comprising:
acquiring, by the first information processing device, first frequency information indicating a first frequency at which first data stored in a first memory has been updated;
acquiring, by the first information processing device, second frequency information indicating a second frequency at which the first data stored in the first memory has been updated due to an update of second data stored in the second memory;
determining, by the first information processing device, when the first data stored in the first memory has been updated, whether a notification indicating that the first data stored in the first memory has been updated is to be transmitted to the second information processing device, based on the first frequency information, the second frequency information, and a state of a communication between the first information processing device and the second information processing device;
transmitting, by the first information processing device, when it is determined that the notification is to be transmitted to the second information processing device, the notification to the second information processing device; and
updating, by the second information processing device, the second data stored in the second memory, based on the notification.

10. The method according to claim 9 wherein
in the determining, when the first data stored in the first memory is updated not due to the update of the second data stored in the second memory, it is determined whether the notification is to be transmitted.

11. The method according to claim 9, wherein
the communication state is a communication throughput between the first information processing device and the second information processing device.

12. The method according to claim 9, further comprising:
specifying, by the first information processing device, a level at which the notification related to the first data is desired to be transmitted, wherein the level is set such that, when at least one of the first frequency and the second frequency becomes higher, the level becomes lower, and in the transmitting, the notification is transmitted when the level is higher than a first value.

13. The method according to claim 12, wherein
in the determining, when the communication state is unstable and the level is equal to or lower than the first value, it is not determined that the notification is to be transmitted.

14. The method according to claim 11, further comprising:

specifying, by the first information processing device, an elapsed time from an update of the first data;

specifying, by the first information processing device, based on the first frequency and the second frequency, expected update time at which at least one of the first data and the second data is to be updated; and specifying, by the first information processing device, based on the elapsed time and the expected update time, an integrated value of the elapsed time, wherein, in the determining, it is determined, based on the integrated value, whether the notification is to be transmitted to the second information processing device.

15. The method according to claim 14, wherein
in the specifying of the integrated value, the integrated value is specified based on the communication throughput and a data amount of the first data.

16. The method according to claim 14, wherein
in the specifying of the integrated value, the integrated value is specified based on a permissible value of the elapsed time.

17. An information processing device configured to communicate with another information processing device, the information processing device comprising:

a memory; and a processor coupled to the memory and configured to:

acquire first frequency information indicating a first frequency at which first data stored in the memory has been updated, acquire second frequency information indicating a second frequency at which the first data stored in the memory has been updated due to an update of second data stored in another memory included in the another information processing device, determine, when the first data stored in the memory has been updated, whether a notification indicating that the first data stored in the memory has been updated is to be transmitted to the another information processing device, based on the first frequency information, the second frequency information, and a state of a communication between the information processing device and the another information processing device, and transmit, when it is determined that the notification is to be transmitted to the another information processing device, the notification to the another information processing device, wherein the another information processing device is configured to update the second data stored in the another memory, based on the notification.

18. The information processing device according to claim 17 wherein the processor is configured to determine, when the first data stored in the memory is updated not due to the update of the second data stored in the another memory, whether the notification is to be transmitted.

19. The information processing device according to claim 17, wherein the communication state is a communication throughput between the information processing device and the another information processing device.

20. The information processing device according to claim 17, wherein the processor is configured to:

specify a level at which the notification related to the first data is desired to be transmitted, and transmit the notification when the level is higher than a first value, wherein the level is set such that, when at least one of the first frequency and the second frequency becomes higher, the level becomes lower.

* * * * *